(12) United States Patent
Hurtta et al.

(10) Patent No.: US 7,948,990 B2
(45) Date of Patent: May 24, 2011

(54) CONTROL DECISIONS IN A COMMUNICATION SYSTEM

(75) Inventors: Tuija Hurtta, Espoo (FI); Alexander Esser, Espoo (FI); Zhi-Chun Honkasalo, Kauniainen (FI)

(73) Assignee: Nokia Corporation, Espoo (FI)

( * ) Notice: Subject to any disclaimer, the term of this patent is extended or adjusted under 35 U.S.C. 154(b) by 1098 days.

(21) Appl. No.: 10/809,711

(22) Filed: Mar. 26, 2004

(65) Prior Publication Data

US 2005/0135375 A1 Jun. 23, 2005

(30) Foreign Application Priority Data

Dec. 19, 2003 (GB) .................................. 0329502.9

(51) Int. Cl.
*H04L 12/56* (2006.01)
(52) U.S. Cl. ..................... 370/395.2; 370/229
(58) Field of Classification Search .................. None
See application file for complete search history.

(56) References Cited

U.S. PATENT DOCUMENTS

| | | | | |
|---|---|---|---|---|
| 5,253,308 | A * | 10/1993 | Johnson | 382/304 |
| 6,295,450 | B1 * | 9/2001 | Lyer et al. | 455/436 |
| 6,621,793 | B2 * | 9/2003 | Widegren et al. | 370/230.1 |
| 6,744,767 | B1 * | 6/2004 | Chiu et al. | 370/395.21 |
| 6,970,423 | B2 * | 11/2005 | Chuah | 370/230 |
| 7,010,615 | B1 | 3/2006 | Tezuka et al. | |
| 2003/0040297 | A1 * | 2/2003 | Pecen et al. | 455/406 |
| 2003/0186678 | A1 | 10/2003 | Lucidarme et al. | |
| 2005/0135375 | A1 * | 6/2005 | Hurtta et al. | 370/395.2 |

FOREIGN PATENT DOCUMENTS

| | | |
|---|---|---|
| EP | 0 959 600 A1 | 11/1999 |
| EP | 0959600 A1 | 11/1999 |
| EP | 1 301 048 A1 | 4/2003 |
| EP | 1301004 A2 | 4/2003 |
| EP | 01301048 A1 | 4/2003 |
| JP | 2000-078207 A | 3/2000 |
| JP | 2001-144758 A | 5/2001 |
| JP | 2003-051857 A | 2/2003 |
| WO | WO 00/10357 * | 1/2000 |
| WO | WO 00/44189 * | 7/2000 |
| WO | WO 00/78080 A1 | 12/2000 |
| WO | WO 02/052869 A2 | 7/2002 |
| WO | WO-02/052869 A2 | 7/2002 |

OTHER PUBLICATIONS

European Search Report, Dated Aug. 4, 2008, Issued on European Application No. 04 801 319.7-1249.
Notification of the second Office Action dated Oct. 30, 2009, issued by the Patent Office of the People's Republic of China, issued in connection with counterpart Chinese application No. 2004800377110.

* cited by examiner

*Primary Examiner* — Robert W Wilson
(74) *Attorney, Agent, or Firm* — Mintz Levin Cohn Ferris Glovsky and Popeo, P.C.

(57) ABSTRACT

A method, system, network and gateway of deciding a policy for controlling communications in a communication system are disclosed. The method comprises determining the type of an access network associated with communications via a gateway. In a further step, a policy to apply to communications via the gateway is decided based on information regarding the type of the access network.

48 Claims, 4 Drawing Sheets

CONTROL DECISIONS IN A COMMUNICATION SYSTEM

BACKGROUND OF THE INVENTION

1. Field of the Invention

The present invention relates to communication systems, and in particular to a step of deciding how to control communications via a gateway. The decision may relate to control operations such as authorization and policy control applied to communications routed via a gateway.

2. Description of the Related Art

A communication system can be seen as a facility that enables communication between two or more entities such as user equipment, servers, gateways and/or other nodes. The communication may comprise, for example, communication of voice, data, multimedia and so on. A communication system may enable a user thereof to be provided with various types of services. For example, a user equipment may be in communication with an application server (AS), such as a service provider server, via a communication system.

The term "service" used above and hereinafter will generally be understood to broadly cover any service which a user may desire, require or be provided with by means of the communication system. The term also will generally be understood to cover the provision of complimentary services. In particular, but not exclusively, the term "service" will be understood to include browsing, downloading, email, streaming services, Internet Protocol multimedia (IM) services (IMS), conferencing, telephony, gaming, rich call, presence, e-commerce and messaging, for example, instant messaging.

Signalling between various entities associated with a communication session is typically required in order to control the communication session. Control is typically required for the set-up of the communication session and also later on during communication on the established session. The signalling can be based on an appropriate communication protocol or protocols.

The communication may be provided by fixed line and/or wireless communication interfaces. An example of the fixed line system is a public switched telephone network (PSTN). The wireless communication may be provided by means of a mobile communication system. Another example of the wireless communication systems is the Wireless Local Area Network (WLAN). Mobile communications systems refer generally to any telecommunications systems which enable a wireless communication for users who may move within the service area of the system. An example of a typical mobile communications systems is a Public Land Mobile Network (PLMN).

A wireless communications system is typically provided with a plurality of access networks. The access networks are for providing a user with a wireless access to the core network part of the communication network. An access network typically comprises at least one base station system and a radio network controller functionality. The access network may be configured to provide a packet service for mobile user equipment via the base stations.

The mobile communication network may then be used for access to other destinations, such as other networks, hosts, services offered by specific service providers and so on. Such an access is provided by nodes commonly referred to as access points. Typically an access point or gateway node of the mobile communication network provides further access to an external network or an external host. For example, if the requested service is provided by a service provider located in another network, the service request is routed via a gateway to the other network and the service provider. The routing may be based on definitions in the mobile subscriber data stored in the mobile network.

A user may need to be a subscriber to the communications system in order to be able to use services provided by means of the communication system. Subscriber data is typically stored in a subscriber database for each subscriber. The database is commonly controlled by the operator of the networks providing the access service. The subscriber data may comprise information regarding the quality of service (QoS) the subscriber is entitled to receive, priorities, service restrictions, security, authentications, charging and so on.

Various different communication standards and protocols have already been developed. New standards and protocols are also continuously developed. To distinguish the earlier developments from the more recent developments, the mobile communication standards are divided in different generations. For example, some standards, such as the first digital cellular standards, are referred to as the second generation (2G) standards while the more recent developments of the digital mobile telephony are often referred to as the third generation (3G) standards.

The access networks the user may use to access services may support substantially different features, depending on the standard used and/or the generation/version of the standard. Furthermore, user may use access networks that are based on unlicensed radio or fixed access techniques. Such access techniques may support substantially different features, depending on the standard, and the manner the individual access systems are built and how these access system are connected to a backbone network. It shall be appreciated that unlike the well standardised cellular mobile systems, there are no strict and/or commonly accepted standards for the unlicensed access systems. For example, public Wireless Local Area Networks (WLAN), residential WLAN, and enterprise WLAN can each be technically considered as being a different access network type. Also, public WLAN access networks for different types of hotspots may be considered as different access network types. For example, different type of WLAN access networks may be provided in hotels in general than in a specific hotel or hotel chain, and so on.

A more detailed example of the possible problems that may be caused by differences between access network types is described below with reference to the general packet radio service (GPRS).

A GPRS based communication system is an example of wireless communication systems that provide packet-switched data transmission for a mobile user equipment. The GPRS operational environment comprises one or more service areas, which are interconnected by a GPRS backbone network. A service area may comprise a number of packet data service nodes (SN). In this specification the service nodes will be referred to as serving GPRS support nodes (SGSN). Each of the SGSNs is connected to at least one radio access network. The access networks may be either 2G or 3G access networks.

The packet data serving nodes are in turn connected to an external data network, e.g. to a public switched data network (PSPDN), via appropriate gateways, such as GPRS gateway support nodes (GGSN). The GPRS thus allow transmission of packet data between mobile user equipment and external data networks.

An example of the data bearers that may be used to carry the traffic flows over the GPRS is a packet data protocol (PDP) context. A PDP context typically includes a radio access bearer provided between the user equipment, the radio network controller and the SGSN, and switched packet data channels provided between the serving GPRS service node (SGSN) and the gateway GPRS service node (GGSN). A session between the user equipment and other party would then be carried on the established PDP context. A PDP context can carry more than one traffic flow, but all traffic flows within one particular PDP context are treated in the prior art the same way as regards their transmission across the network. The requirement regarding similar treatment is based on PDP context treatment attributes associated with the traffic flows. These attributes may comprise, for example, quality of service and/or charging attributes.

Some features associated with a service flow may need to be controlled by the gateway. Gateway may need to apply control to a traffic flow when setting up a data bearer. Control may also need to be applied to a traffic flow on an already established data bearer. The control is based on so called policy. In brief, a policy can be seen as a set of rules how the traffic flow shall be controlled.

Differences in the type of the access networks may cause problems in certain situations. A problem may be caused by the lack of information regarding the access network at the gateway. This may make it impossible for the gateway to appropriately provide control of traffic flows between the different networks it interfaces. A particular problem relates to service specific control of features such as Quality of Service (QoS), security, charging, access control and so on.

SUMMARY OF THE INVENTION

Embodiments of the present invention aim to address one or several of the above problems.

According to one embodiment of the invention, there is provided a method of deciding a policy for controlling communications in a communication system. The method comprises determining the type of an access network associated with communications via a gateway. In a further step a policy to be applied to communications via the gateway is decided based on information regarding the type of the access network.

According to another embodiment of the present invention there is provided a communication system comprising different access networks and a gateway configured for communication with entities associated with different access networks. The communication system comprises access network type determination means configured to determine the type of an access network and a decision making entity configured to decide a policy that is to be applied to communications via the gateway based on information of the type of an access network. The communication system is configured such that the gateway is configured to control communications based on decisions by the decision making entity.

According to yet another embodiment of the present invention there is provided a gateway configured for communication with entities associated with different access networks of a communication system. The gateway comprises an access network type determining means configured to determine the type of an access network. The gateway also comprises a decision making means configured to decide a control policy that is to be applied to communications via a gateway based on information of the type of an access network. The gateway is configured to control traffic flows based on decisions by the decision making means.

The embodiments of the invention may enable access specific control of service provisioning in a communication system. Flexibility of the communication systems may be improved. Operational costs of a communication system may be reduced. The embodiments may improve operation during an handover or other change of access network.

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENTS

Figure 1:
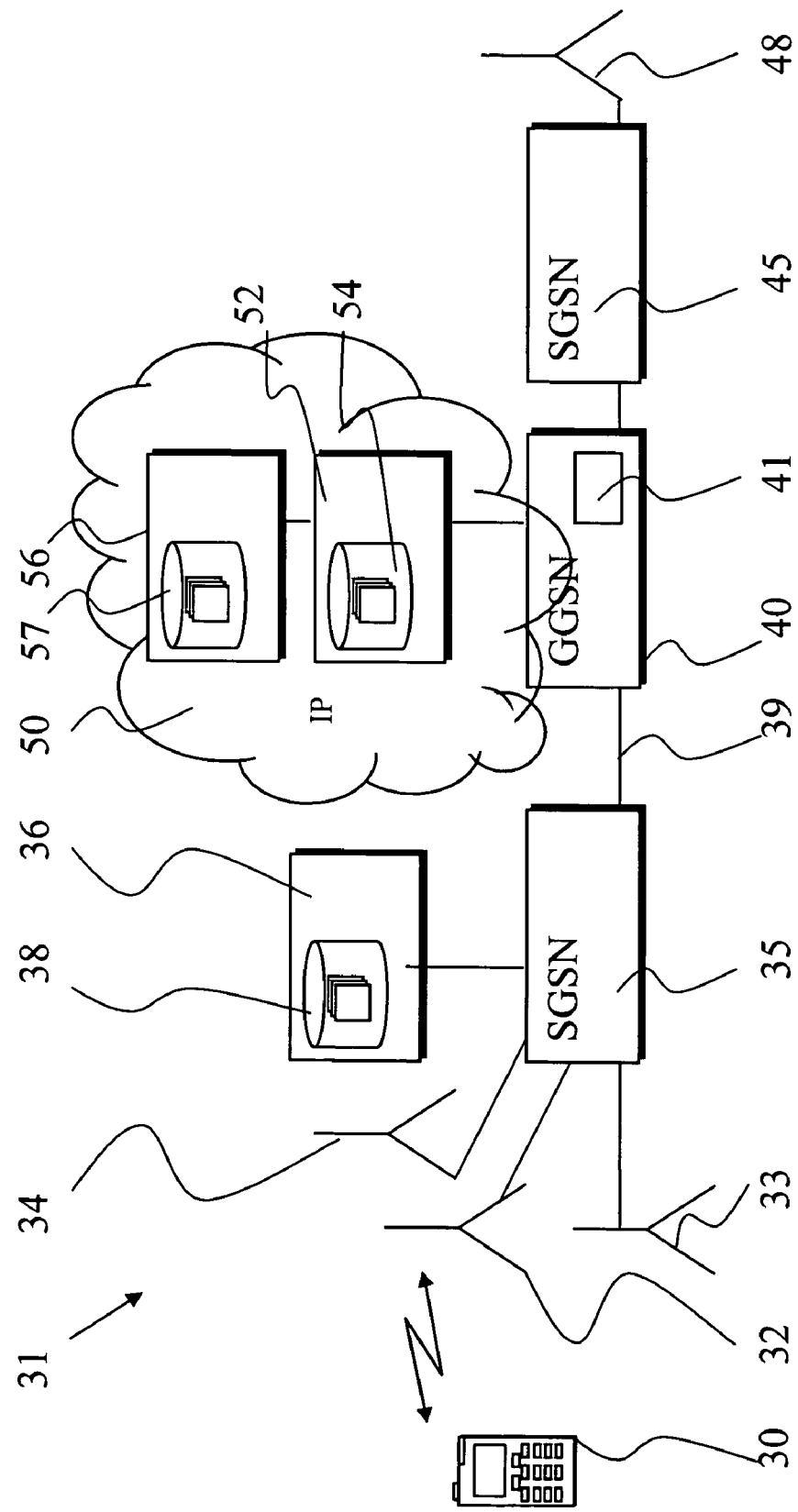
FIG. 1 shows schematically a communication system wherein the present invention may be embodied.

Certain embodiments of the present invention will now be described by way of example with reference to the architecture of a GPRS based mobile communications system shown in FIG. 1. However, it shall be understood that embodiments of the invention are applicable to any other suitable form of networks as well.

A mobile communication system may logically be divided between a radio access network (RAN) and a core network (CN). In the simplified presentation of FIG. 1, each base station 31 to 34 and 48 belongs to a radio access network. A radio access network (RAN) may be controlled by appropriate radio network controller (RNC), a base station controller (BSC) or similar. This is not shown in order to enhance clarity. A radio access network controller is typically connected to an appropriate core network entity or entities such as, but not limited to, a serving general packet radio service support node (SGSN) 35 and 45. It shall be appreciated that, although, for clarity, FIG. 1 shows only few base stations, typically the nodes of a core network are connected to a number of base stations via an appropriate controllers.

A user equipment within a radio access network may communicate with a radio network controller via radio network channels which are typically referred to as radio bearers (RB). These radio network channels may be set up in a mobile telecommunications network in a known manner. Each user equipment 30 may have one or more radio network channels open at any one time with the radio network controller. The relevant radio access network controller is in communication with the serving GPRS support node 35 via an appropriate interface, for example on an Iu interface.

The serving GPRS support node 35, in turn, typically communicates with a gateway GPRS support node 40 via the GPRS backbone network on interface 39. This interface is commonly a switched packet data interface. The serving GPRS support node 35 and/or the gateway GPRS support node 40 are for provision of support for GPRS services in the network.

A subscriber database entity 36 for storing information associated with the subscriber of the user equipment 30 is also shown. The subscriber database may contain various records 38 associated with the subscriber, such as details of a PDP context subscription of the subscriber of the user equipment.

The basic operational principles of a mobile user equipment, that may also be referenced to as a mobile station, are generally known by those skilled person. A mobile user equipment is normally configured for wireless communication with other stations, typically with the base stations of a mobile communication system for enabling mobility thereof.

A mobile user equipment may include an antenna element for wirelessly receiving and/or transmitting signals from and/or to the base stations of the mobile communication network. A mobile user equipment may also be provided with a display for displaying images and/or other graphical information for the user of the mobile user equipment. Speaker means are also typically provided. The operation of the mobile user equipment may be controlled by means of an appropriate user interface, such as control buttons, voice commands and so on. Furthermore, a mobile station is typically provided with a processor entity and/or a memory means. Communication between the mobile user equipment and the entities of the communication network may be based on any appropriate communication protocol. A user may use the mobile user equipment for tasks such as, but not limited to, for making and receiving phone calls, for receiving and sending data from and to the network and for experiencing, for example, multimedia content by means on PDP contexts. For example, a user may access the network by means of a Personal Computer (PC), Personal Data Assistant (PDA), mobile station (MS) and so on.

It shall be appreciated that, although for clarity, only one equipment is shown in FIG. 1, a number of user equipment may be in simultaneous communication with a base station.

Overall communication between user equipment 30 in an access network and the gateway GPRS support node 40 may be provided by a packet data protocol (PDP) context. Each PDP context usually provides a communication pathway between a particular user equipment and the gateway GPRS support node 40. Once established, a PDP context can typically carry multiple flows. Each flow normally represents, for example, a particular service and/or a media component of a particular service. The PDP context therefore often represents a logical communication pathway for one or more flows across the network. To implement the PDP context between user equipment 30 and the serving GPRS support node 35, radio access bearers (RAB) are usually established which commonly allow for data transfer for the user equipment. The implementation of these logical and physical channels is known to those skilled in the art and is therefore not discussed further herein.

It shall be appreciated that other access networks, for example non-cellular access networks, may also be used for establishing a client access bearer between the user equipment 30 and the gateway GPRS support node 40. Such a client access bearer shall be understood as being an equivalent to a PDP context since it also provides a logical communication pathway across the network. For example, in WLAN access or fixed broadband access networks, a client access bearer may be realized by means of Virtual Private Networking (VPN), Point-to-Point Protocol (PPP), or Mobile IP technology.

The user equipment 30 may connect, via access to the GPRS network, to servers that are generally connected to an external data network such as, but not limited to, the exemplifying Internet Protocol (IP) network 50.

A policy control entity 52 interfacing with the gateway 40 is also shown. The policy controller may be provided by any appropriate network entity. For example, the policy control entity may be provided by means of a combined authorization and policy control node. An IP Session Control (IPSC) node or a policy decision function (PDF) may also be employed for this purpose. The policy control entity 52 may be provided with a database 54 for storing information required for making service specific authorization and policy decisions.

In the embodiment of FIG. 1 the gateway 40 is provided with an access network type determining means 41. In the preferred embodiment the type determination means comprise an appropriate software code product running on a processor provided in the gateway 40. Possible configurations of the determination means 41 and the function thereof will be described below in more detail.

FIG. 1 shows also a subscription manager entity 56 connected to the policy control entity 52. The subscription manager may be provided by means of a directory server or any other appropriate database configured to store information associated with the services available for the subscriber. For example, the subscription manager may contain information regarding services that are allowed for a certain subscriber or a group of subscribers. The subscription manager 56 may store in a database 57 thereof information such as indications if a subscriber is allowed to browse the web, send and receive emails, receive content from application servers and so on. As shown by FIG. 1, the subscription manager 56 may be a different entity from the subscriber database 38 associated with the access network.

In the embodiments information regarding the relevant access network type may be used as a criteria when making authorization and policy decisions. A policy to be decided may be e.g. a QoS policy, a security policy, a charging policy, a chained service policy, and so on, or a policy covering an appropriate combination of various policies.

Figure 2:
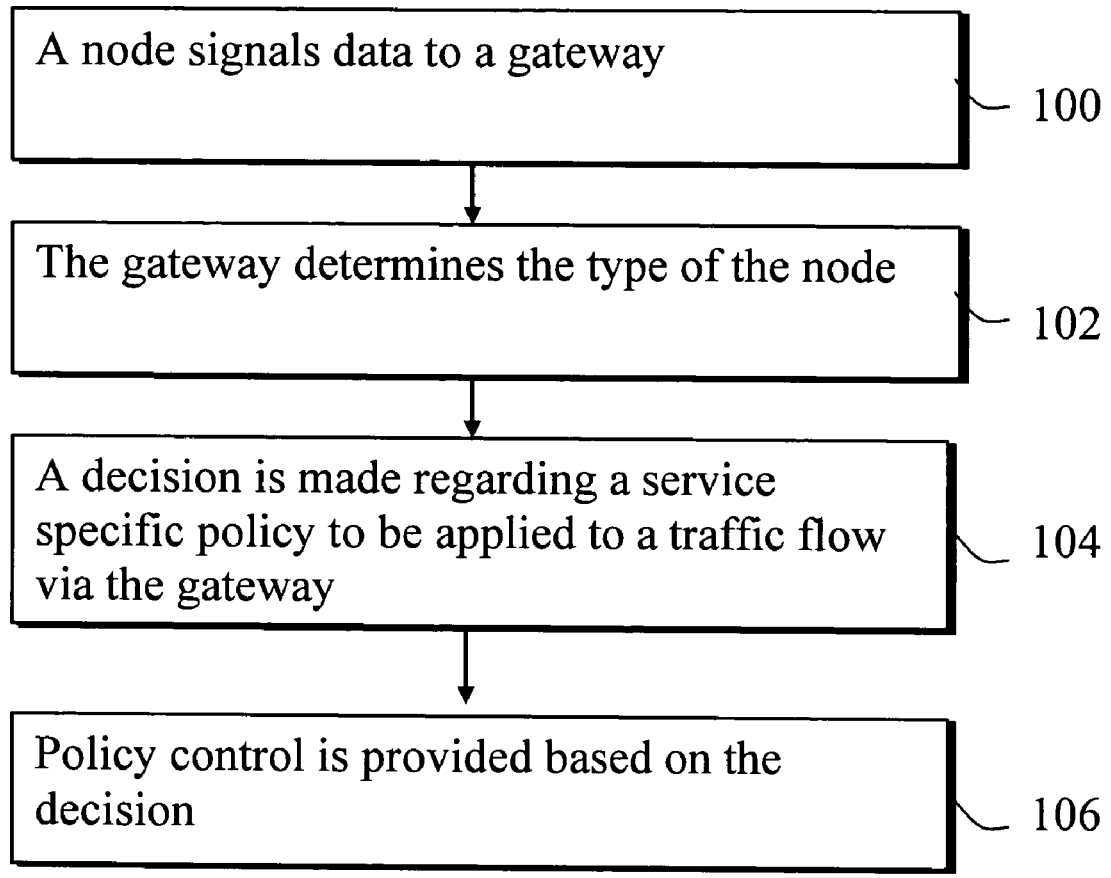
FIGS. 2 and 3 show signalling flowcharts in accordance with some exemplifying embodiments of the present invention.

FIG. 2 shows a flowchart in accordance with an embodiment of the present invention. In step 100 a node associated with the access network signals data associated with an access bearer or a service flow to a gateway. The node may be, for example an SGSN or a user equipment. The data may be signalled in a message from the SGSN or the user equipment to the gateway. The message may be a request for a data bearer or any other message associated with the control of data bearer. At step 102 the gateway may determine the type of the node. For example, it may need to be determined if the node associated with the access network supports only one of 2G and 3G standards or a WLAN standard. Once the type of the node is known, the type of the access network the user equipment is attached to may be determined based on this information.

The determining means 41 may be configured to determine the access network type based on, for example, information received from a packet data node associated with the access network, such as a SGSN or wireless access gateway (WAG). In accordance with an embodiment, the gateway may determine the type of the access network based on information received from the user equipment. The information may include a type indicator included in a message. Rather than using information received from the access network, the decision may also be based on information otherwise available for the gateway.

For example, if it is possible to have either a 2G or a 3G based access system, a SGSN may indicate in a message, for example in a request for a data bearer, whether it is a 2G or 3G SGSN. According to a possibility the gateway may derive the 2G/3G information from the address of the SGSN. In a similar manner, the gateway may determine that the access network is a WLAN based access system based on an indication by the network node sending message or based on the address of the network node. The gateway may also derive the access network type from the characteristics of a message from the network node or user equipment. For example, the determination of the access network type may be based on the format or protocol of a message received from the access network. The access network type may also be derived based on information of the physical port through which the gateway received the message. According to a possibility the user equipment may explicitly indicate the access network type to the gateway. The gateway may also derive the access network type from the address of the user equipment. These possibilities may in particular be applicable to but not limited to WLAN based access.

Once the type is determined, a decision is made in step 104 regarding the service specific policy that is to be applied to the data bearer and/or service flow or flows. In step 106 the gateway then applies control to the data bearer and/or traffic flow or flows in accordance with the decision made at step 104.

It shall be appreciated that the decision may be made in relation to a traffic flow on a data bearer that has been established a while ago. The traffic flow may be a new traffic flow on that data bearer, or some of the parameters associated with the traffic flow may have changed. For example, the user equipment may have moved to another access network.

Figure 3:
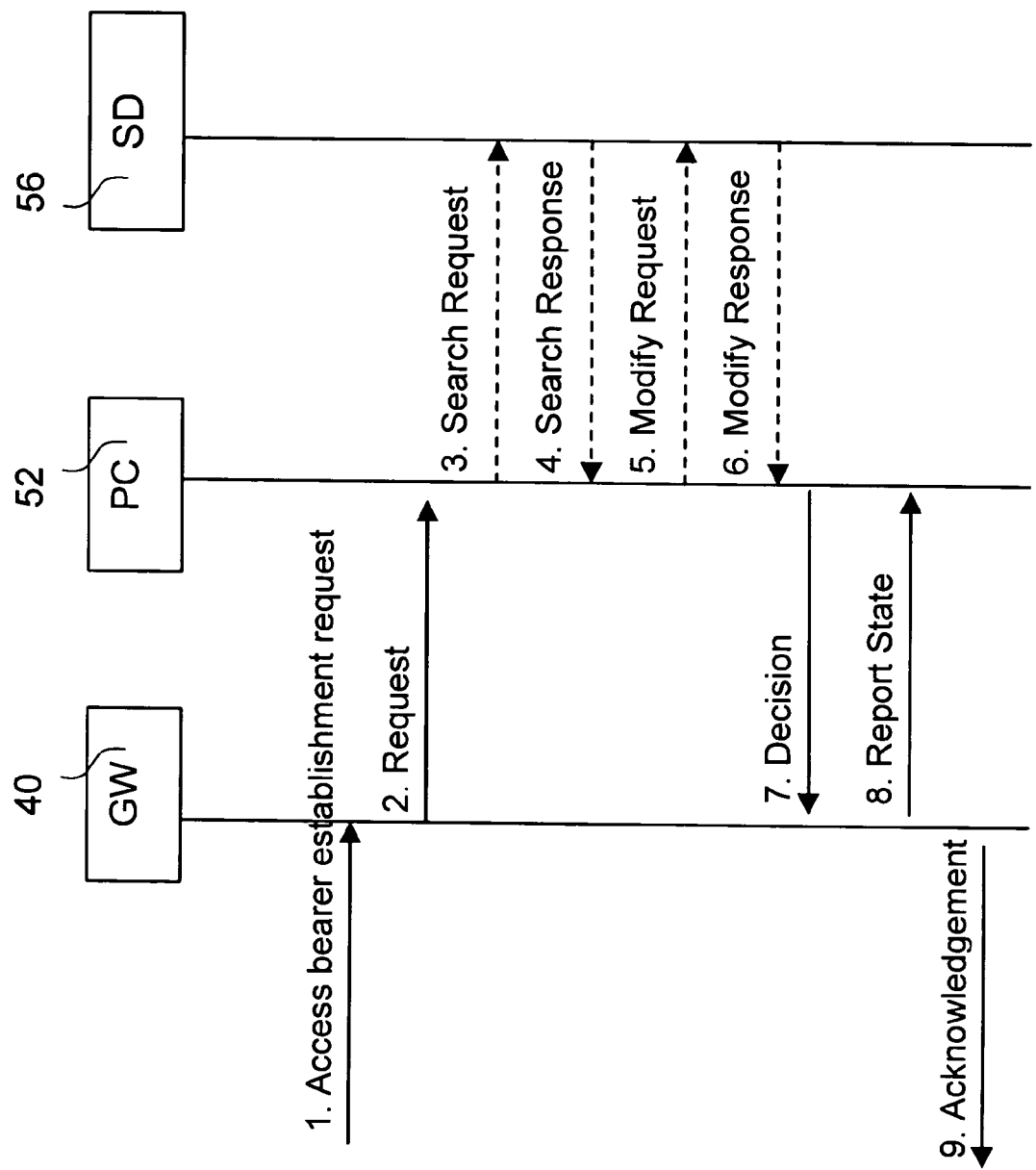
Figure 4:
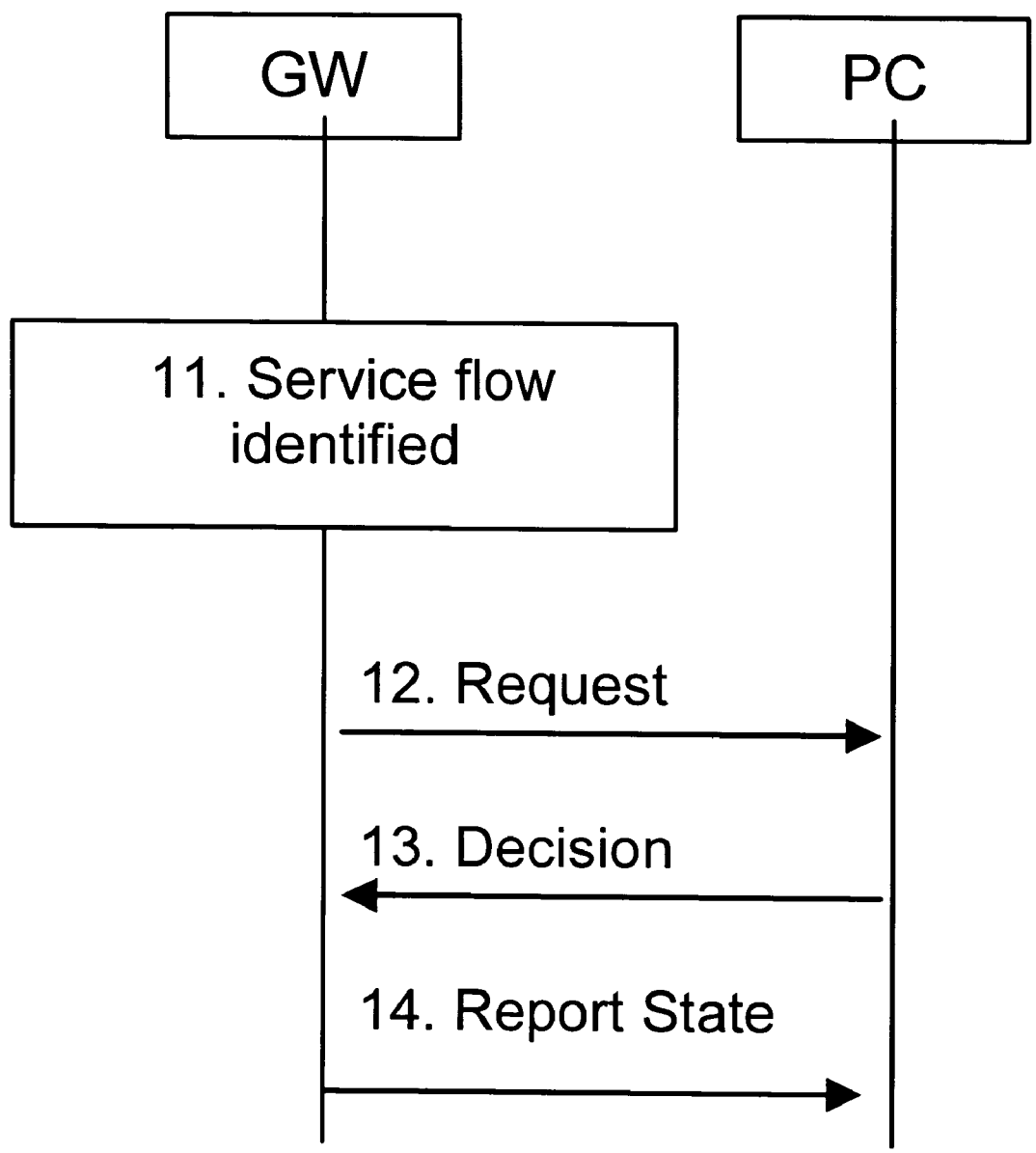
FIG. 4 is a flowchart illustrating the operation of an embodiment of the present invention.

The following describes in more detail two exemplifying embodiments with reference to signalling flowcharts of FIGS. 3 and 4.

FIG. 3 shows a signalling flowchart for a possible access bearer establishment procedure. In the example a gateway 40 receives message 1 requesting for an access bearer establishment, for example for activation of a PDP context or a client access bearer.

The gateway 40 may determine at this stage whether authorization and policy control is required. This may be based on a list of access points that require/do not require authorization and policy control. If authorization and policy control is deemed as being required, the gateway 40 may resolve the address of an appropriate policy control entity e.g. based on a pre-defined policy controller address information. The policy control entity address may be stored in the gateway per each access point. Instead of storing this information in the gateway, the address information may be fetched from an external database. The address information may be contained in the list or other record used for storing an indication if the authorization and policy control is required in the first place.

The gateway 40 sends then a request message 2 to the policy control entity 52. The message may include information such as identity of the user/subscriber, access point (AP), type of the access network, and so on.

As mentioned above, the access network type may be determined based on various information. For example, a SGSN or a user equipment may include an indication of the access network type in message 1.

The policy control entity 52 may then use the information sent by the gateway 40 to derive information for authorization and policy control decision making.

If the subscription profile is not available in the policy control entity 52, the policy control entity may determine whether it is possible that a subscriber profile is available in a subscriber manager 56 containing a subscription directory (SD). In case of home subscribers, the policy control entity 52 may send a Search Request message 3 to the subscriber manager to retrieve the subscription profile. If there is no subscription profile available (e.g. in case of visiting subscribers), default subscription profile may be used instead.

If information is requested from the subscriber manager, the request may be responded by a Search Response (Subscription Profile) message 4. The subscription profile may include access specific attributes for each authorized access point and/or service, e.g. a 2G/3G/WLAN QoS policy, a 2G/3G/WLAN security policy and/or a 2G/3G/WLAN charging policy.

The policy control entity 52 may want the subscriber manager to send notifications on changes in the subscription profile. If this is to be used, the policy control entity may send a 'Modify Request' message 5 to the subscriber manager. This message may include information such as user equipment identity, the address of the policy control entity, and an 'Add Address' command. The subscriber manager may then reply message 5 by sending a 'Modify Response' (Status) message 6 to the policy control entity.

The policy control entity 52 may perform an authorization and policy decision by using the access network type as one decision criteria. The policy control entity may send a decision message 7 to the gateway 40.

Examples of parameters included in the decision are parameters such as 'subscription Identity', 'Allowed Services', 'Access Bearer Charging Policy', Access Bearer QoS Policy', 'Service Flow Chained Services', 'Service Flow Chained Service Policies', 'Service Flow Charging Policy', 'Service Flow QoS Policy', and so on. From these parameters the 'Subscription Identity' may be used to identify the subscription. The 'Allowed Services' may indicate the services which are allowed on the access bearer. The 'Access Bearer Charging Policy' may indicate how the access bearer is to be charged. The charging policy may be indicated to be, for example, one of 'online', 'offline with time reporting', and 'offline with volume reporting'. The 'Access Bearer QoS Policy' parameter may indicate maximum values for the Quality of Service (QoS) Class and bitrates of the access bearer. The 'Service Flow Chained Services' parameter may indicate which data processing functions to be performed for the service flow and in which sequence. The 'Service Flow Chained Service Policies' parameter may indicate policies for the data processing functions to be performed for the service flow. The 'Service Flow Charging Policy' parameter may indicate how the service flow is to be charged (e.g. online/offline with time reporting/offline with volume reporting). The 'Service Flow QoS Policy' may indicate max values for the QoS Class and bitrates of the service flow.

A decision may also contain policies for multiple service flows. For example, one set of policies may be for a service flow 1 and another set of policies may be for a service flow 2.

For each access bearer and/or service flow, an access specific QoS policy, an access specific charging policy, access specific information on chained services and access specific policies for the chained services may be included if the policy is personalized for the subscription and if further control by the policy control entity is not required. If further control by policy control entity is required for any of the policies, a policy control entity controlled flag may be included instead of the policy.

It shall be appreciated that the policy control entity 52 may send either policies relevant for the access network type or policies for all access network types to the gateway. In the latter approach it may not be necessary to indicate the access network type from the gateway to the policy control entity in message 2. In the latter approach, the gateway may use the access network type to determine the policies to be enforced.

Access specific policies which are not personalized for the subscription may be configured to the gateway. If the gateway does not receive a policy from the policy control entity, it may then apply as a default a policy which is configured to the gateway.

The policy decision by the policy control entity 52 is sent to the gateway 40 in message 7. The gateway enforces the policy decision in the provisioning of the service. The gateway may send a 'Report State (Status)' message 8 to the policy control entity. This may be simply an indication if the policy has been enforced successfully.

The gateway may then acknowledge the access bearer establishment in message 9 to the SGSN, thus completing the access bearer establishment procedure from its behalf.

It shall be appreciated that although FIG. 3 shows an embodiment wherein the policy decision is made at an external policy control entity 52, it is possible for the gateway itself to decide the policy to be applied to a specific access bearer and/or service flow. The gateway may be provided with appropriate software and hardware to provide the decision making functions. The decision making may be integrated with the determination means 41 of FIG. 1.

FIG. 4 shows an example for policy control for an already existing service flow. This type of operation may be required for example if different service flows have been assigned with different service flow policies, or if the service flow policy is not decided when the access bearer is established.

In step 11 the gateway identifies a service flow. The gateway may then determine that (one or more) policies for the service flow are not available in the gateway. A further control by a policy control entity is thus determined as being required for the service flow. The gateway may then resolve the address of the policy control entity e.g. by using pre-defined address information. The gateway may map the packet filter of the service flow into a service flow name and sends a Request message 12 to the policy control entity. Message 12 may include parameters such as 'Service Flow Name', 'Access Network Type'. The 'Access Network Type' parameter may be used to indicate if the user equipment has accessed the service via e.g. a 2G, 3G, or a WLAN access network.

The policy control entity may have stored the access network type when providing the first decision to the gateway, as described above with reference to the access bearer establishment. In this case, it is not necessary to indicate the type of the access network anymore when requesting policies for a service flow.

The policy control entity may use the name of the service flow or other service flow identity sent by the gateway to derive attributes from the subscription profile stored at access bearer establishment. The policy control entity performs a policy decision procedure and sends the decision in message 13 to the gateway. The decision regarding the service flow policies may include any access network specific policies which were not provided to the gateway at access bearer establishment.

The policy control entity may send only such policies that are relevant for the specific access network type. Alternatively, policies for all access network types may be sent to the gateway. If the latter approach is selected, it is not necessary to indicate the type of the access network to the policy control entity in message 12. In the latter approach, the gateway may use the access network type to determine the policies to be enforced.

The gateway then enforces the policy decision.

The gateway may send a 'Report State (Status)' message 14 to the policy control entity.

A third use example relates to handover from an access network of a first type to an access network of another type. For example, a user equipment may be handed over from a 2G access network to a 3G access network, or between a WLAN access network and a 2G or 3G access network. The handover may be controlled by the network, by the user equipment, or by both. Information about the handover may be signalled to the gateway either by a network node or by a user equipment. The gateway may derive the new access network type by means of methods described above for deriving access network types. If the access network type changes this may trigger authorization and/or policy control for an already existing access bearer and/or service flow, as shown in FIG. 3 such that the new access network type is indicated in step 2 of FIG. 3. The same may apply for step 12 of FIG. 4.

It shall be appreciated that the signalling step 100 of FIG. 2 may not always be necessary. For example, a gateway may be able to determine the type of an access network based on other information without any signalling from other nodes. For example, the gateway may be provided with a GPRS access point, this being an indication that the access network type is GPRS, a WLAN access point this being an indication that the access network type is WLAN, a circuit switched (CS) data access point, this being an indication that the access network type is CS Data, and so on.

It should be appreciated that whilst embodiments of the present invention have been described in relation to user equipment such as mobile stations, embodiments of the present invention are applicable to any other suitable type of user equipment.

It shall be appreciated that the embodiments may be applied to any gateway, for example a Packet Data gateway of WLAN (wireless Local Area Network) access, a Packet Data Serving Node of CDMA access, a Network Access Server of Circuit Switched Data (CSD) access, or a Broadband Remote Access Server (BRAS) or Digital Subscriber Line Access Multiplexer (DSLAM) of fixed broadband access.

The detailed examples are given in the context of data bearers such as PDP contexts. Any suitable data carriers, for example PPP sessions, client VPN connections, or Mobile IP connections may be controlled accordingly.

The embodiments of the present invention are described above in the context of a communication system that is based on a GPRS backbone. This invention is also applicable to any other communication systems where similar problems may exist.

In addition, the term policy controller entity is intended to cover all controller entities configured to control provision of services in systems wherein services can be provided for users and/or wherein different entities associated with a session may have different service provisioning criteria.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   determining a type of an access network via which a service is to be provided to a user equipment;
   sending from a gateway to a policy control entity a message including an indication of the type of the access network via which the service is to be provided;
   receiving at the gateway from said policy control entity a message indicating a traffic flow control policy decided on the basis of information regarding the type of the access network; and
   enforcing at the gateway in the provisioning of said service via said access network the traffic flow control policy.

2. A method as claimed in claim 1, comprising:
   receiving data from an entity associated with the access network at the gateway; and
   determining the type of the access network based on said data.

3. A method as claimed in claim 2, comprising receiving type information from the entity at the gateway.

4. A method as claimed in claim 2, wherein the entity associated with the access network comprises a node connected to the access network.

5. A method as claimed in claim 2, wherein the entity associated with the access network comprises said user equipment.

6. A method as claimed in claim 2, comprising receiving a request for a data bearer at the gateway.

7. A method as claimed in claim 6, wherein the request for a data bearer includes information regarding the type of the access network.

8. A method as claimed in claim 6, wherein the request comprises another request for creation of a packet data protocol context.

9. A method as claimed in claim 1, wherein the determining comprises determining the type in the gateway.

10. A method as claimed in claim 1, comprising receiving at the gateway a message from an entity associated with the access network, and wherein the determining comprises determining the type of an access network based on the address of the entity associated with the access network.

11. A method as claimed in claim 1, comprising receiving at the gateway a message from an entity associated with the access network, and wherein the determining comprises:
determining the type of the access network supported by the entity associated with the access network; and
determining the type of the access network from the access type supported by the entity associated with the access network.

12. A method as claimed in claim 1, comprising receiving at the gateway a message from an entity associated with the access network, and wherein the determining comprises determining the type of the access network based on a characteristic of said message received from the entity associated with the access network at the gateway.

13. A method as claimed in claim 1, comprising determining in the gateway if a service specific policy is already available for the identified communication session.

14. A method as claimed in claim 1, wherein the deciding comprises selecting an access network specific policy.

15. A method as claimed in claim 1, further comprising determining if the access network operates in accordance with one of:
a second generation standard, a third generation standard, or a wireless local area network standard.

16. A method as claimed in claim 1, wherein the traffic flow control policy is a service specific policy.

17. A method as claimed in claim 1, wherein the information regarding the type of the access network is one of a quality of service policy, a security policy, and a charging rule.

18. A method as claimed in claim 1, comprising receiving at the gateway from a policy control entity a plurality of traffic flow control policies, and selecting one of said plurality traffic flow control policies based on said information regarding the type of the access network.

19. A method as claimed in claim 1, comprising making the traffic flow control policy decision at the gateway.

20. A computer program product comprising computer code stored on a non-transitory computer readable medium, the computer code configured to control a processor to decide a traffic flow control policy for controlling communications in a communication system, the computer code, when executed on the processor, causing the processor to perform operations comprising:
determining a type of an access network via which a service is to be provided to a user equipment;
sending from a gateway to a policy control entity a message including an indication of the type of the access network via which the service is to be provided;
receiving at the gateway from said policy control entity a message indicating the traffic flow control policy decided on the basis of information regarding the type of the access network; and
enforcing at the gateway in the provisioning of said service via said access network the traffic flow control policy.

21. A communication system comprising:
a plurality of access networks;
a gateway configured to communicate with entities associated with the plurality of access networks;
an access network type determination processor configured to determine a type of an access network of the plurality of access networks via which a service is to be provided to a user equipment; and
a decision making processor configured to decide a traffic flow control policy to apply to communications via the gateway based on information of the type of the access network sent from the gateway to a policy control entity,
wherein communications are controlled based on decisions by the decision making processor, the decisions including the traffic flow control policy sent from the policy control entity to the gateway.

22. An apparatus, comprising:
an access network type determining processor configured to determine a type of an access network via which a service is to be provided to a user equipment;
a transmitter to send to a policy control entity a message including an indication of the type of the access network via which the service is to be provided;
a gateway configured to receive from said policy control entity a message indicating a traffic flow control policy decided on the basis of information regarding the type of the access network; and
an enforcing processor configured to enforce at the gateway in the provisioning of said service via said access network the traffic flow control policy.

23. An apparatus as claimed in claim 22, wherein the access network type determining processor is configured to determine the type of the access network based on data received at the gateway from an entity associated with the access network.

24. An apparatus as claimed in claim 23, comprising a receiver configured to receive type information from the entity at the gateway.

25. An apparatus as claimed in claim 23, wherein the entity associated with the access network comprises a node connected to the access network.

26. An apparatus as claimed in claim 23, wherein the entity associated with the access network comprises said user equipment.

27. An apparatus as claimed in claim 23, comprising a receiver configured to receive a request for a data bearer at the gateway.

28. An apparatus as claimed in claim 27, wherein the request for a data bearer includes information regarding the type of the access network.

29. An apparatus as claimed in claim 27, wherein the request comprises another request for creation of a packet data protocol context.

30. An apparatus as claimed in claim 22, wherein the access network type determining processor is provided at the gateway.

31. An apparatus as claimed in claim 22, comprising a receiver configured to receive at the gateway a message from an entity associated with the access network, and wherein the access network type determining processor is configured to determine the type of an access network based on the address of said entity associated with the access network.

32. An apparatus as claimed in claim 22, comprising a receiver configured to receive at the gateway a message from an entity associated with the access network, and wherein the access network type determining processor is configured to determine the type of the access network supported by the entity associated with the access network, and determine the type of the access network from the access type supported by the entity associated with the access network.

33. An apparatus as claimed in claim 22, comprising a receiver configured to receive at the gateway a message from an entity associated with the access network, and wherein the access network type determining processor is configured to determine the type of the access network based on a characteristics of said message received from the entity at the gateway.

34. An apparatus as claimed in claim 22, further comprising an identifying processor configured to identify a communication session by the gateway.

35. An apparatus as claimed in claim 34, comprising a determining processor configured to determine in the gateway if a service specific policy is already available for the identified communication session.

36. An apparatus as claimed in claim 22, comprising a receiver configured to receive at the gateway from a policy control entity a plurality of traffic flow control policies, and a decision making processor configured to select one of said plurality traffic flow control policies based on said information regarding the type of the access network.

37. An apparatus as claimed in claim 22, comprising:
a transmitter configured to send from a gateway to a policy control entity a message including an indication of the type of the access network via which the service is to be provided; and
a receiver configured to receive at said gateway from said policy control entity a message indicating said traffic flow control policy decision.

38. An apparatus as claimed in claim 22, comprising a decision making processor configured to decide said traffic flow control policy at the gateway.

39. An apparatus, comprising:
means for determining a type of an access network via which a service is to be provided to a user equipment;
means for sending a policy control entity a message including an indication of the type of the access network via which the service is to be provided;
means for receiving from said policy control entity a message indicating a traffic flow control policy decided on the basis of information regarding the type of the access network; and
means for enforcing at a gateway in the provisioning of said service via said access network the traffic flow control policy.

40. A method, comprising:
determining a type of an access network via which a service is to be provided to a user equipment;
making at a policy control entity a traffic flow control policy decision using as one decision criteria the determined type of the access network via which the service is to be provided to the user equipment, the determined type of the access network being indicated in a message sent from a gateway to the policy control entity; and
sending to the gateway from said policy control entity a message indicating said traffic flow control policy decision.

41. A method as claimed in claim 40, comprising receiving a request for said traffic flow control policy decision from the gateway, wherein the request includes an indication of the type of the type of the access network via which the service is to be provided.

42. A method as claimed in claim 40, further comprising sending an inquiry for a subscription profile from the policy control entity to a separate database.

43. A method as claimed in claim 40, further comprising authorizing a user at the policy control entity.

44. An apparatus, comprising:
an access network type determining processor configured to determine a type of an access network via which a service is to be provided to a user equipment;
a decision making processor configured to decide at a policy control entity a traffic flow control policy decided using as one decision criteria a type of an access network via which a service is to be provided to a user equipment; and
a transmitter configured to send to a gateway from said policy control entity a message indicating said traffic flow control policy.

45. An apparatus according to claim 44, comprising a receiver configured to receive a request for said traffic flow control policy decision from the gateway, wherein the request includes an indication of the type of the type of the access network via which the service is to be provided.

46. An apparatus as claimed in claim 44, further comprising a transmitter configured to send an inquiry for a subscription profile from the policy control entity to a separate database.

47. An apparatus as claimed in claim 44, further comprising an authorizing processor configured to authorize a user at the policy control entity.

48. An apparatus, comprising:
means for determining a type of an access network via which a service is to be provided to a user equipment;
means for deciding at a policy control entity a traffic flow control policy using as one decision criteria a type of an access network via which a service is to be provided to a user equipment; and
means for sending to a gateway from said policy control entity a message indicating said traffic flow control policy.

* * * * *